(12) United States Patent
Nightingale et al.

(10) Patent No.: US 9,834,119 B2
(45) Date of Patent: Dec. 5, 2017

(54) VEHICLE SEATING

(71) Applicant: Jaguar Land Rover Limited, Whitley, Coventry, Warwickshire (GB)

(72) Inventors: Hugo Nightingale, Leamington Spa (GB); Sandy Boyes, Kenilworth (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/917,946

(22) PCT Filed: Sep. 9, 2014

(86) PCT No.: PCT/EP2014/069202
§ 371 (c)(1),
(2) Date: Mar. 9, 2016

(87) PCT Pub. No.: WO2015/032983
PCT Pub. Date: Mar. 12, 2015

(65) Prior Publication Data
US 2016/0214510 A1 Jul. 28, 2016

(30) Foreign Application Priority Data
Sep. 9, 2013 (GB) .................................. 1316015.5

(51) Int. Cl.
*B60N 2/36* (2006.01)
*B60N 2/30* (2006.01)

(52) U.S. Cl.
CPC ........... *B60N 2/3095* (2013.01); *B60N 2/309* (2013.01); *B60N 2/3065* (2013.01); *B60N 2/3079* (2013.01); *B60N 2/36* (2013.01)

(58) Field of Classification Search
CPC .. B60N 2/3095; B60N 2/3065; B60N 2/3079; B60N 2/36
(Continued)

(56) References Cited

U.S. PATENT DOCUMENTS 4,105,245 A * 8/1978 Simons .................. B60N 2/045
296/65.09
6,631,938 B1 10/2003 Burns
(Continued)

FOREIGN PATENT DOCUMENTS

DE 10239199 A1 3/2004
EP 2033839 A1 3/2009
(Continued)

OTHER PUBLICATIONS

Combined Search and Examination Report corresponding to application No. GB1316015.5, dated Mar. 18, 2014, 6 pages.
(Continued)

*Primary Examiner* — H Gutman
(74) *Attorney, Agent, or Firm* — Reising Ethington P.C.

(57) ABSTRACT

Vehicle seating, selectively deployable at the rear of a vehicle for providing temporary outdoor seating. The seating is moveable between a first, stowed position in which the seating surface is locatable on or within a load floor of the vehicle and a second, deployed position in which support legs and a seating surface connected thereto are pivoted up and out of the load floor so that the seating surface overlaps with or extends beyond a rearmost edge of the vehicle and an engaging member engages the support surface to provide load bearing support for the seating surface.

19 Claims, 9 Drawing Sheets

(58) Field of Classification Search
USPC .......................................................... 296/66
See application file for complete search history.

(56) References Cited

U.S. PATENT DOCUMENTS

| | | | | |
|---|---|---|---|---|
| 7,201,426 B2* | 4/2007 | Villeminey | ........... | B60N 2/3011 296/65.09 |
| 7,850,220 B2 | 12/2010 | Holdampf | | |
| 8,528,958 B2* | 9/2013 | Imamura | .............. | B60N 2/3011 296/65.09 |
| 8,632,113 B2* | 1/2014 | Mather | ................ | B60N 2/2356 296/65.01 |
| 2008/0129072 A1* | 6/2008 | Epaud | ....................... | B60N 2/06 296/66 |
| 2011/0031775 A1* | 2/2011 | Clor | ..................... | B60N 2/3011 296/66 |

FOREIGN PATENT DOCUMENTS

| | | | |
|---|---|---|---|
| FR | 2967103 | A1 | 5/2012 |
| GB | 2514888 | A | 12/2014 |
| JP | S619351 | A | 1/1986 |
| WO | WO2006130975 | A1 | 12/2006 |

OTHER PUBLICATIONS

International Search Report corresponding to International Application No. PCT/EP2014/069202, dated Nov. 21, 2014, 4 pages.
Written Opinion corresponding to International Application No. PCT/EP2014/069202, dated Nov. 21, 2014, 7 pages.
Combined Search and Examination Report corresponding to application No. GB1415909.9, dated Mar. 16, 2015, 7 pages.

* cited by examiner

VEHICLE SEATING

TECHNICAL FIELD

This invention relates to the field of vehicle seating, selectively deployable at the rear of the vehicle to provide temporary additional outdoor seating when the vehicle is stationary. Aspects of the invention relate to such seating and a vehicle incorporating such seating.

BACKGROUND

At outdoor activities such as sporting events, it is well-known to use the lower tailgate of a sports utility vehicle, pick-up truck or the like as a temporary bench seat. This is not particularly comfortable and a number of prior art seating arrangements are known, for example that described in U.S. Pat. No. 7,431,370 in which a seating accessory comprising foldable seats attachable to the tailgate is described. Such temporary seating is only available for vehicles having a fold-down or lower tailgate as the tailgate itself provides the seating surface.

For vehicles having an single upwardly-opening or side-opening tailgate, any temporary outdoor seating has to use the load floor and/or the bumper to support or to be the seating surface. If the seating is on the load floor, it undesirably occupies load space when not in use and, when in use, the bumper may get in the way of the seated occupant's legs.

It is an aim of the invention to address disadvantages associated with the prior art.

SUMMARY OF THE INVENTION

According to an aspect of the invention there is provided vehicle seating, selectively deployable at the rear of a vehicle for providing temporary outdoor seating, comprising:
  a seating surface having a front edge nearest the rear of the vehicle, a rear edge nearest the front of the vehicle, in use;
  a supporting structure locatable within or beneath a load floor of a vehicle;
  a first support leg pivotally connected at a first end to the underside of said seating surface and pivotally connectable at a second end to said supporting structure and having a rear-facing first support surface between the ends;
  a second support leg pivotally connected at a first end to the underside of said seating surface and at a second end to said supporting structure and having a forward-facing first engaging member between the ends,
  wherein the seating is moveable between a first, stowed position in which the seating surface is locatable on or within the load floor of the vehicle and a second, deployed position in which the support legs and seating surface connected thereto are pivoted up and out of the load floor so that said seating surface overlaps with or extends beyond a rearmost edge of the vehicle and said engaging member engages said support surface to provide load bearing support for said seating surface.

The vehicle seating is easily deployed by the user and provides a very sturdy and solid load bearing seating surface. The deployed seating surface overlaps with or extends beyond a rearmost edge of the vehicle so that the load floor edge (and/or rear bumper of the vehicle) does not provide an obstruction to the legs of a seated person. The deployed seating surface may be located directly above or above and extending beyond the rear bumper of the vehicle, providing a desirably high seating position. When stowed, the seating surface may be flush with the load floor of the vehicle so as not to use up valuable load space.

In an embodiment, the supporting structure is an enclosure mountable within or beneath the load floor of the vehicle and wherein, in said stowed position, the seating surface provides a lid for said enclosure which is substantially flush with the surface of the load floor and the first and second support legs are stowed at least partially within the enclosure.

In an embodiment, said seating surface has a length and the first and second support legs are axially aligned along said length of the seating surface, with the second support leg axially displaced from the first support leg towards said rear edge. Optionally, the first support leg and/or the second support leg is non-linear.

In an embodiment, said first support leg comprises a rear-facing second engaging member and wherein said second support leg comprises a forward-facing second support surface and, wherein, in said first stowed position, said second engaging member engages said second support surface to provide load bearing support for said seating surface.

Optionally the or each support surface comprises a shelf and the or each engaging member comprises a protrusion.

In an embodiment the first support leg comprises a seat-supporting member near its first end which, in the deployed position, engages the underside of the seating surface. This provides additional load-bearing support to the seating surface in the deployed position. Optionally, the underside of said seating surface includes a recess for receipt of said seat-supporting member.

In an embodiment, the or each support surface is substantially the same width as the enclosure. This gives even better load bearing support to the seating surface in both deployed and stowed positions.

In an embodiment, the seating surface includes a handle thereon or therein. Optionally, the seating surface is made from or covered with the same material as the load floor of the vehicle in which the seating is to be installed.

According to another aspect of the invention there is provided vehicle seating, selectively deployable at the rear of a vehicle for providing temporary outdoor seating, comprising a seating surface having a front edge nearest the rear of the vehicle, in use, wherein the seating is pivotally connectable to a vehicle via at least one pivot member such that it is moveable between a first, stowed position in which the seating surface is locatable on or within the load floor of the vehicle and a second, deployed position in which the seating surface is pivoted up and out of the load floor so that said front edge of the seating surface overlaps with or extends beyond a rearmost edge of the vehicle.

According to another aspect of the invention there is provided a vehicle including vehicle seating as described according to proceeding aspects of the invention. Optionally the vehicle includes two of such vehicle seats which are separately operable. In the deployed position, the seating surface may be higher than a rear bumper of the vehicle. Optionally, in the deployed position, the seating surface overlaps a rear bumper of the vehicle or extends beyond a rear bumper of the vehicle.

Further features of the invention are defined in the appended claims.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Throughout this application, the terms "front", "forward", "rear" and "rearward" are used in relation to the described vehicle seating. These terms are used from the point of view of a user standing at the rear of the vehicle looking into the load space where the vehicle seating is located. The "front" edge of the seating is the edge furthest from the front of the vehicle and the "rear" edge of the seating is the edge nearest to the front of the vehicle. When the seating moves "forward", it is moving away from the front of the vehicle.

Figure 1:
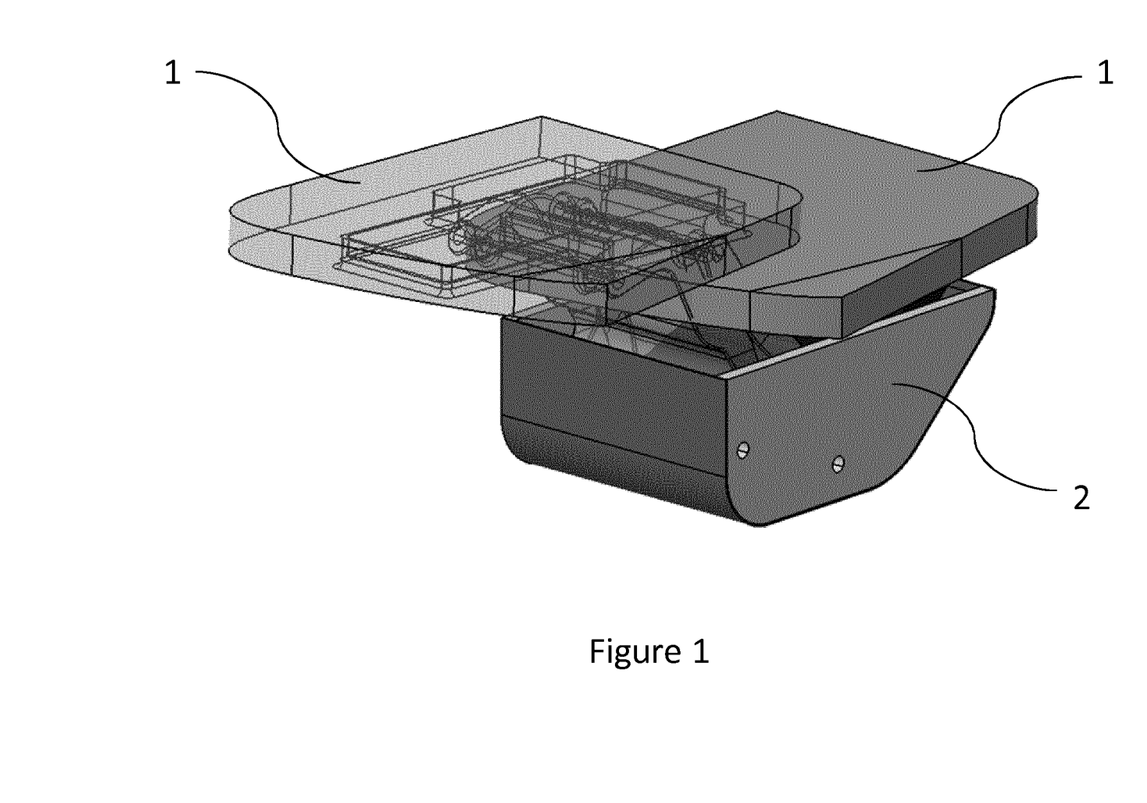
FIG. 1 is a perspective view of vehicle seating according to an embodiment of the invention, showing the seat in both deployed and partially stowed positions.

Referring to FIG. 1, an overview of vehicle seating according to an embodiment of the invention is shown. The seating provides a temporary outdoor seat that is normally stowed in the load floor at the rear of the vehicle. When deployed, the seat pivots upwards and forward so that it rises over the rear bumper of the vehicle providing a seating position which overlaps or extends beyond the rear bumper and/or rear edge of the load space.

Figure 2:
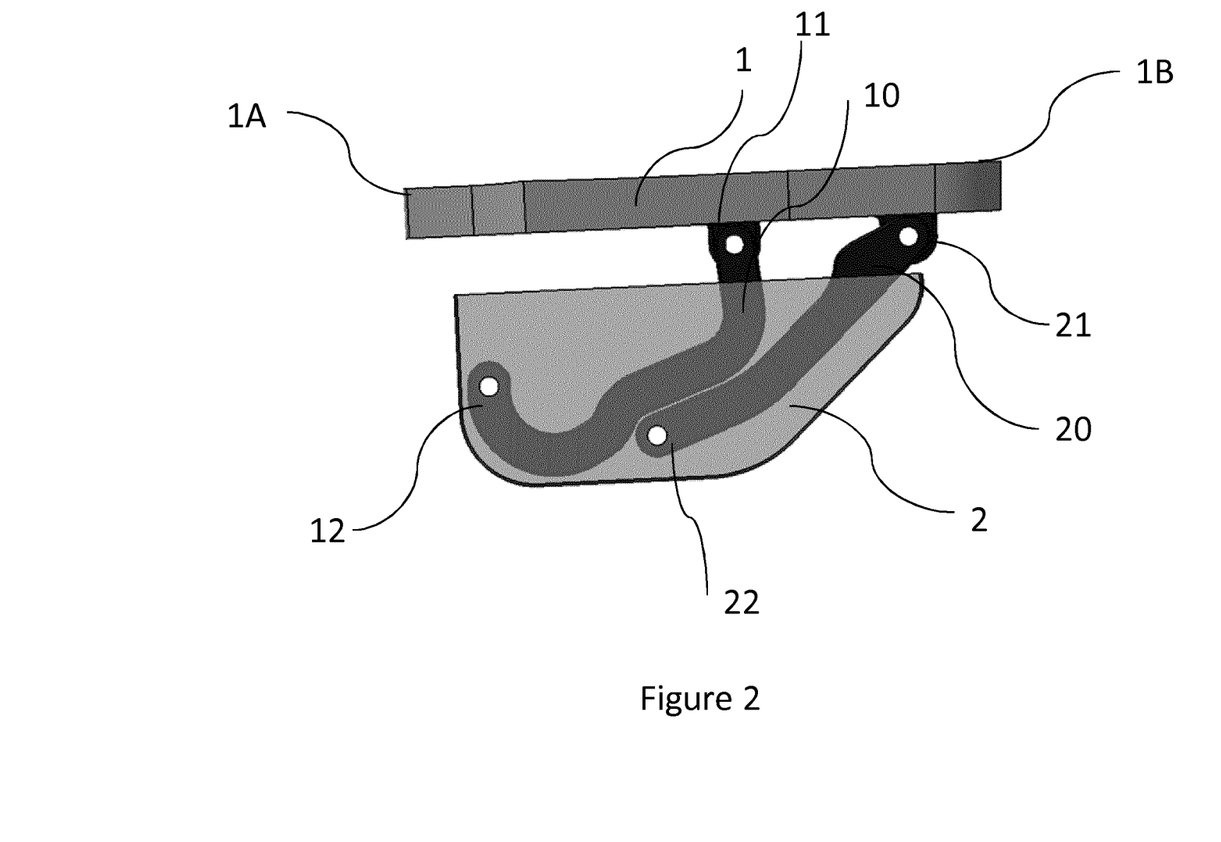
FIG. 2 is a side view, partly in section of vehicle seating according to an embodiment of the invention in the stowed position.
Figure 3:
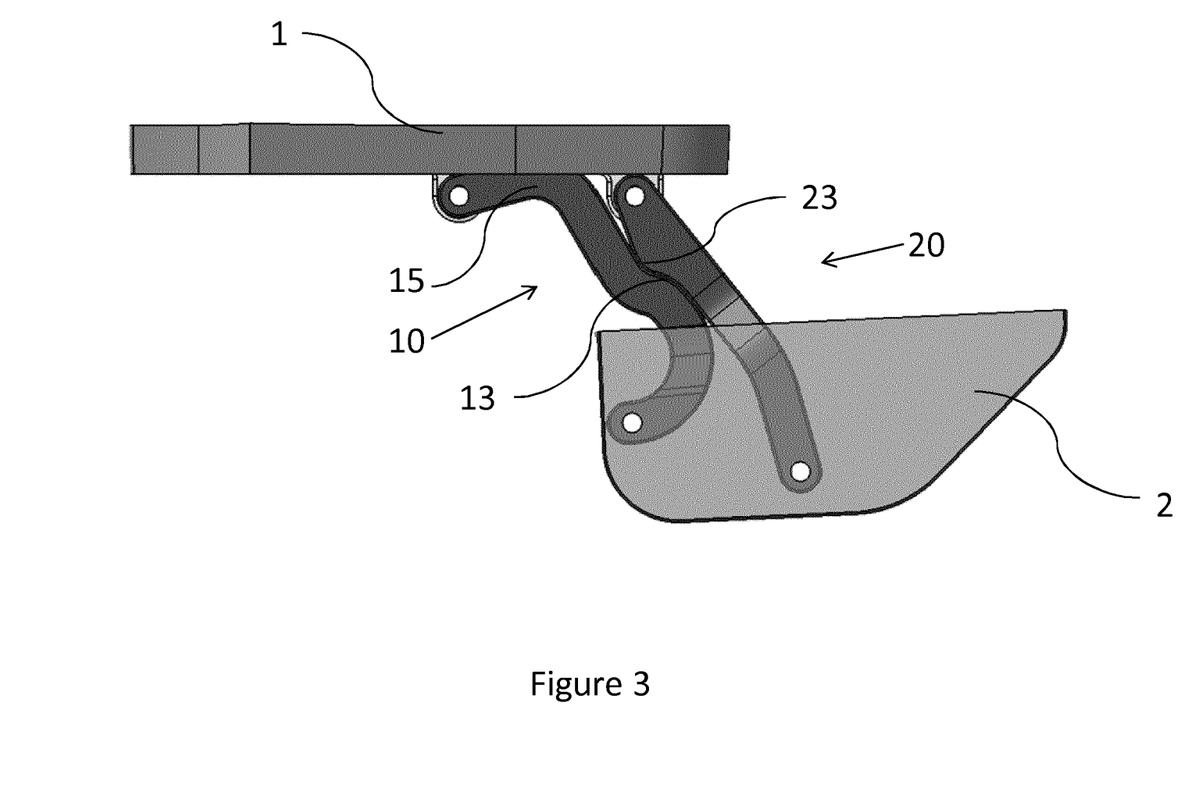
FIG. 3 is a side view, partly in section of the vehicle seating of FIG. 2 in the deployed position.

Referring to FIGS. 2 and 3, there is provided a seating surface 1 which is suitably sized to form the lid of a supporting structure in the form of a generally box shaped enclosure 2. The seating surface has a front edge 1A and a rear edge 1B. The enclosure 2 is mountable in the load floor 3 of a vehicle 4 so that the seating surface 1 is flush with the load floor itself. "Mountable" in this context includes the possibility of the enclosure being an integral part of the load floor construction. The seating surface 1 may be made from or covered with the same material as the load floor of the vehicle in which it is installed.

As shown in FIG. 2, the seating surface "lid" 1 does not need to be in contact with the uppermost edge of the enclosure 2. What is important is that the seating surface 1 sits flush with the load floor (not shown) when in the stowed position illustrated in FIG. 2 so that the stowed seating does not use any of the normal load space. The seating surface 1 may be of any desired shape and is not limited to the illustrated embodiments.

A first support leg 10 is pivotally connected at a first end 11 to the underside of the seating surface 1 and at a second end 12 to the enclosure. A second support leg 20 is pivotally connected at a first end 21 to the underside of the seating surface 1 and at a second end 22 to the enclosure. The second support leg 20 is axially displaced from the first support leg 10 in a direction towards the front of the vehicle (towards the rear edge of the seating surface) but they are otherwise generally aligned with one another as they need to engage with one another as described in more detail below. In the stowed position illustrated in FIG. 2, the first and second support legs are stowed largely within the enclosure 2.

In some embodiments, the second ends 12, 22 of the support legs are connected to a supporting structure other than an enclosure 2. The supporting structure is locatable within or beneath the load space of a vehicle and may be an integral part thereof.

FIG. 3 shows the vehicle seating in its deployed position. The seating may be moved between the stowed and deployed positions by means of a handle 5 located within or on the seating surface 1 (see FIG. 9). The user simply reaches into the load space of the vehicle, grabs the handle 5 and pulls the seating surface 1 forward towards them until the seat reaches the condition illustrated in FIG. 3.

In the deployed position, the first and second support legs "nest" together to provide sufficient load bearing support for a person sitting on the seating surface 1. The first support leg 10 has a rear-facing first support surface 13 which may be in the form of a rear-facing shelf. The second supporting leg 20 has a forward-facing first engaging member 23 which may be in the form of a forward-facing protrusion. The first support surface 13 and first engaging member 23 nest together in the deployed position to provide load-bearing support. Although not illustrated in FIG. 2, the support legs 10, 20 may be almost as wide as the enclosure 2 (such that they might be described as support panels rather than legs), giving a very solid base for the deployed seating surface.

The first support leg 10 may be provided with a seat-supporting member 15 near its first end which engages the underside of the seating surface 1 in the deployed position and provides further load-bearing support. The underside of the seating surface may include a recess 6 (see FIG. 8) for receipt of the seat-supporting member 15.

Throughout this application, the term "engages" means that the components concerned engage or abut or connect or otherwise make contact with each other.

FIGS. 4-8 show movement of the vehicle seating from the stowed position to the deployed position, and illustrates the change of position of the seating in relation to the load floor 3.

Figure 4:
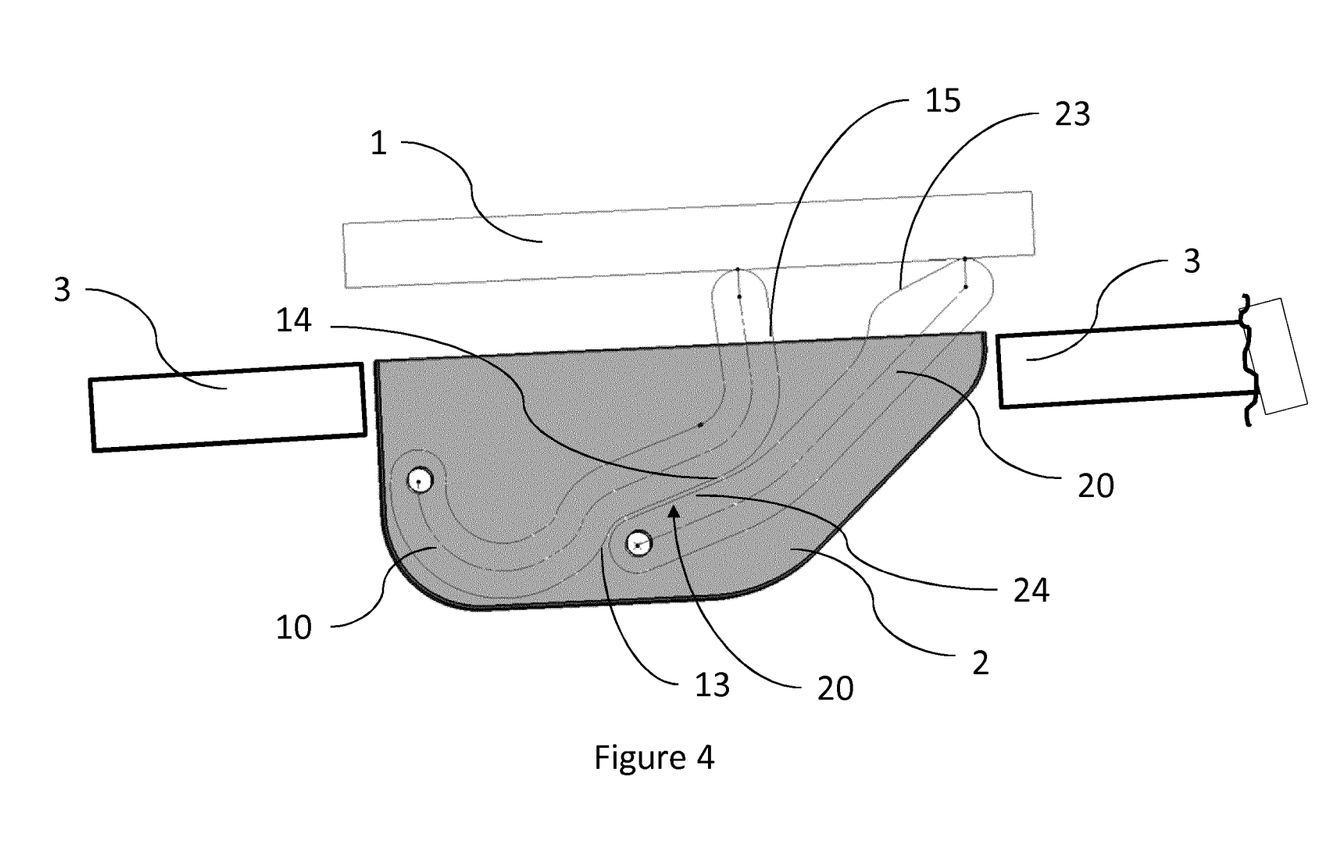
FIGS. 4-8 are a series of side views of the vehicle seating of FIG. 2 showing movement of the vehicle seating from the stowed position to the deployed position.

FIG. 4, like FIG. 2, shows the vehicle seating in the stowed position. In contrast to the deployed position, it can be seen that the first support surface 13 and first engaging member 23 are substantially separated from one another in this initial stowed position.

The first support leg 10 is provided with a rear-facing second engaging member 14 which may simply be a surface or may be a protrusion or other arrangement. The second support leg 20 is provided with a forward-facing second support surface 24 which may be a load-bearing shelf. In the stowed position, the second engaging member 14 engages the second support surface 24, the legs 10 and 20 again "nesting" together to provide load-bearing support for the seating surface 1. In the stowed position, the seating surface 1 is unlikely to be bearing the weight of a person but it needs to bear the weight of luggage in the load space of the vehicle.

The seat-supporting member 15 on the first support leg 10 does not contact the underside of the seating surface 1 in the stowed position.

Figure 5:
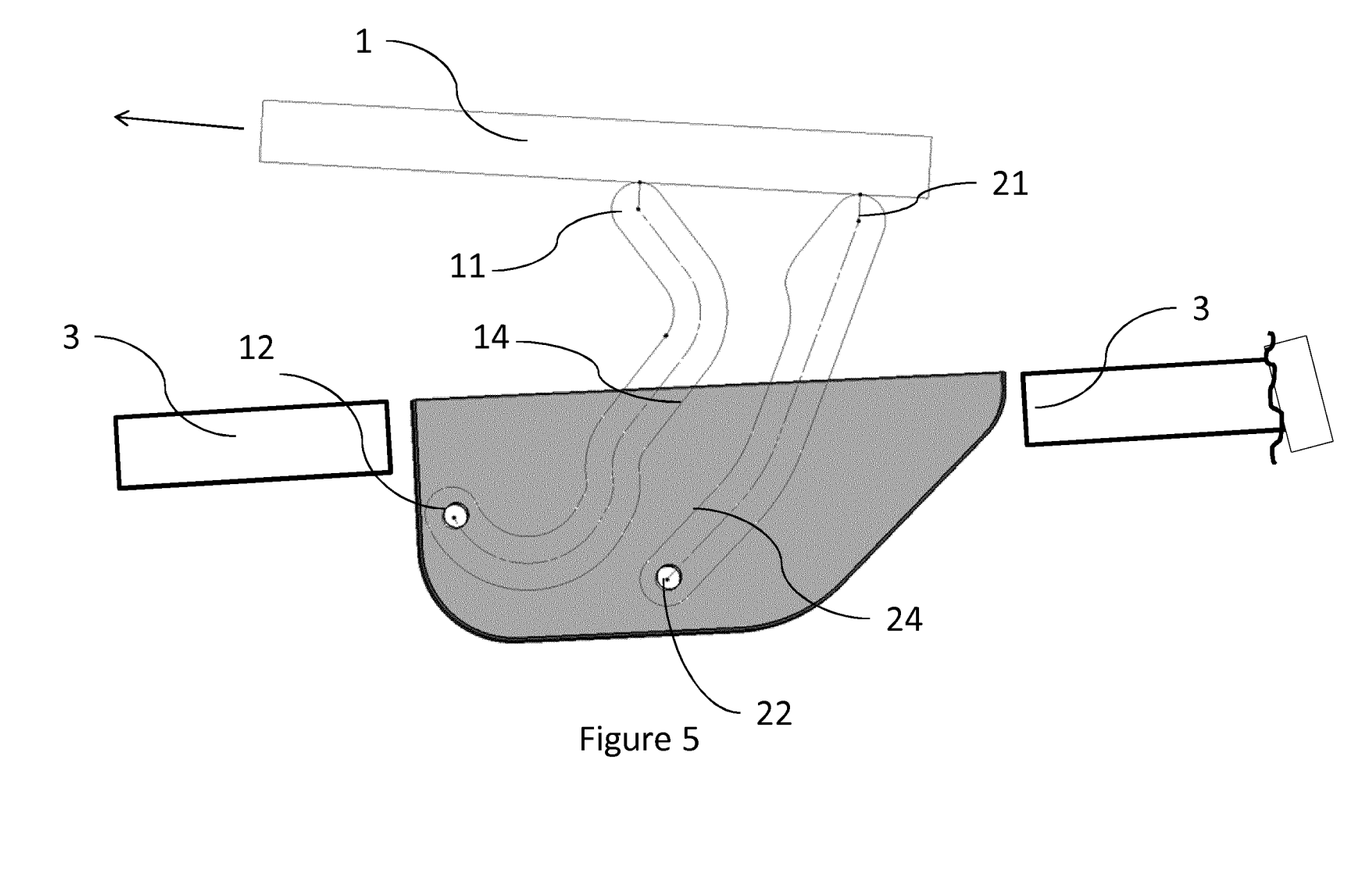

FIG. 5 shows the vehicle seating in an approximately 30% deployed condition. As the seating surface 1 is pulled up and forward in the direction indicated by the arrow, the second engaging member 14 disengages from the second support surface 24 and both legs 10, 20 pivot forwards about their respective ends 11, 12 and 21, 22.

Figure 6:
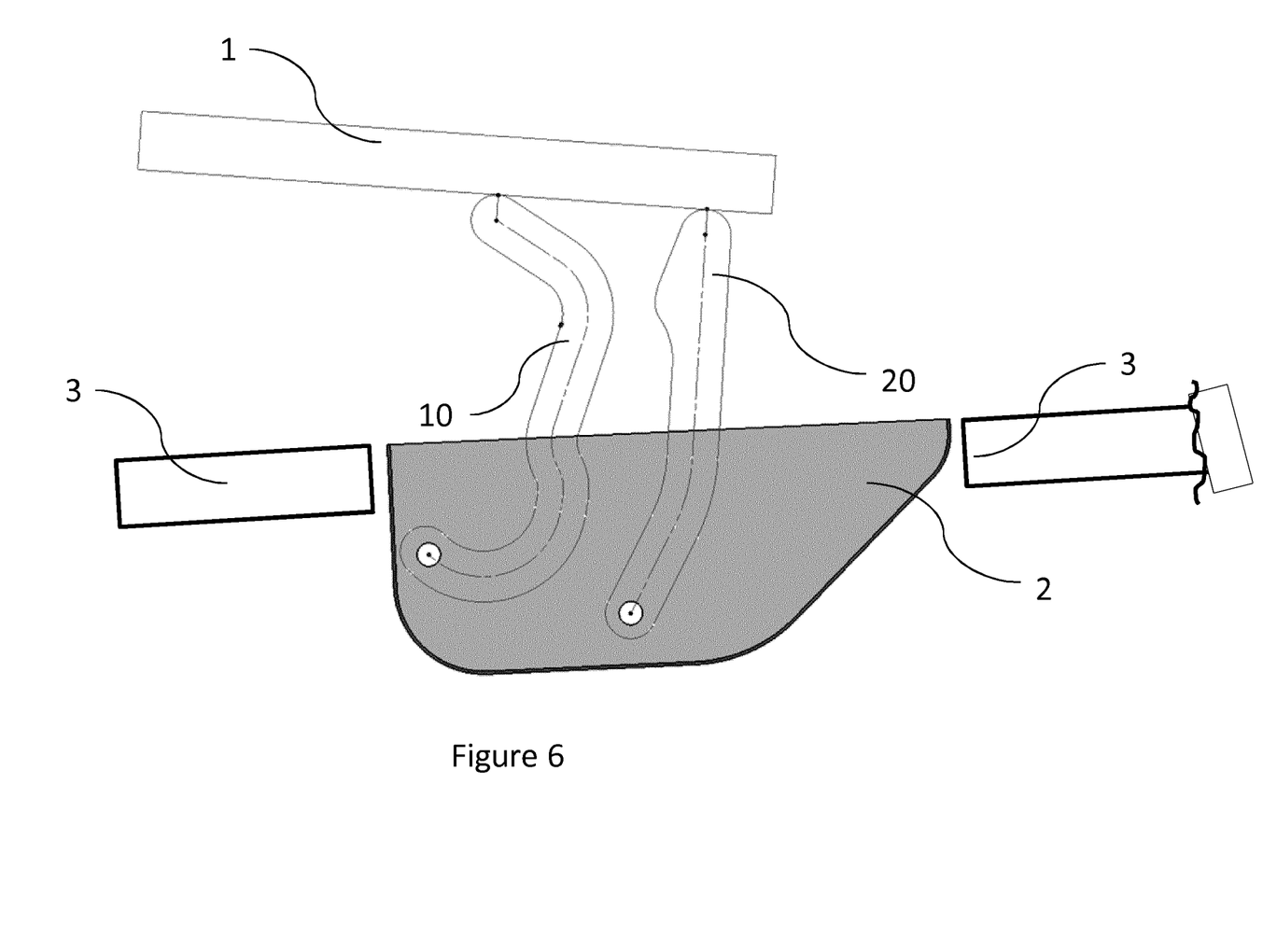

FIG. 6 shows the vehicle seating in an approximately 50% deployed condition in which the support legs 10 and 20 are almost vertical and the seating surface 1 is at its highest position with respect to the enclosure 2.

Figure 7:
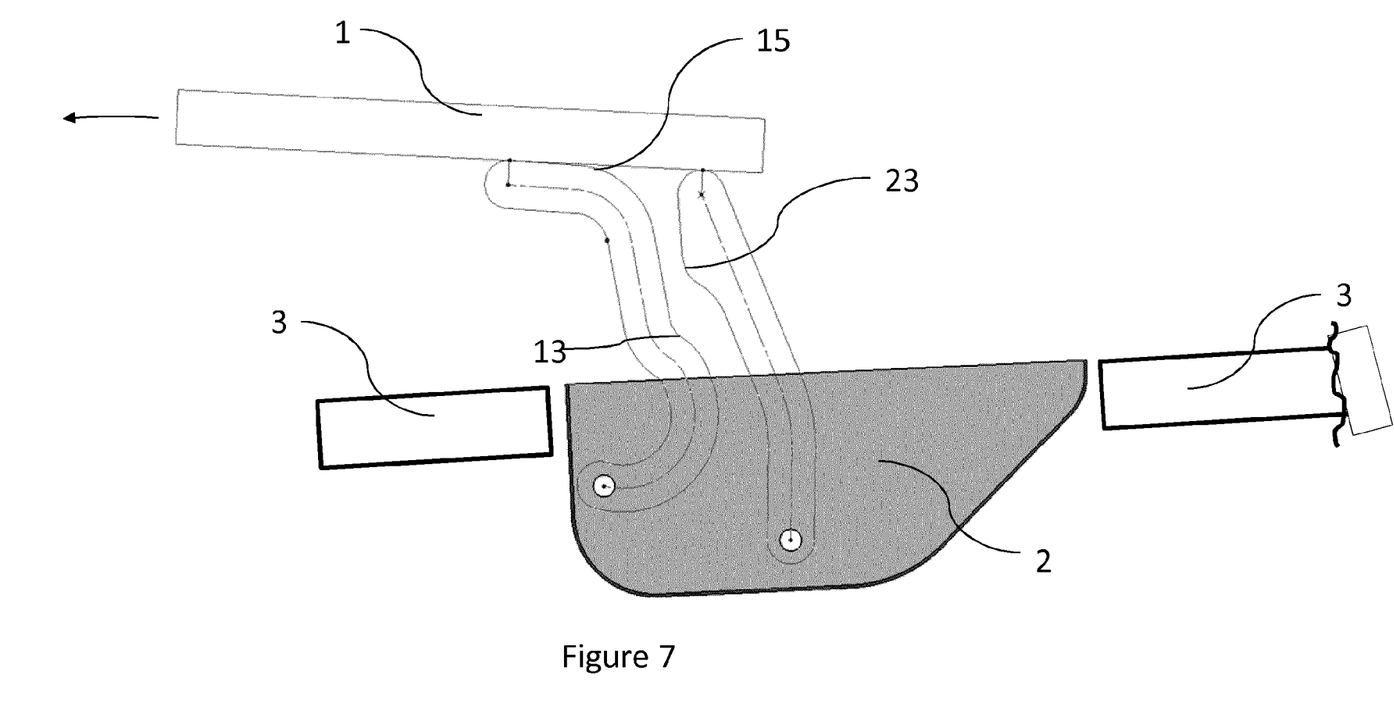

As the vehicle seating continues to be deployed (FIG. 7 shows an approximately 80% deployed condition), the seating surface 1 starts to lower again with respect to the enclosure 2. The first engaging member 23 starts to approach the first support surface 13 and the seat-supporting member 15 starts to approach the underside of the seating surface 1.

Figure 8:
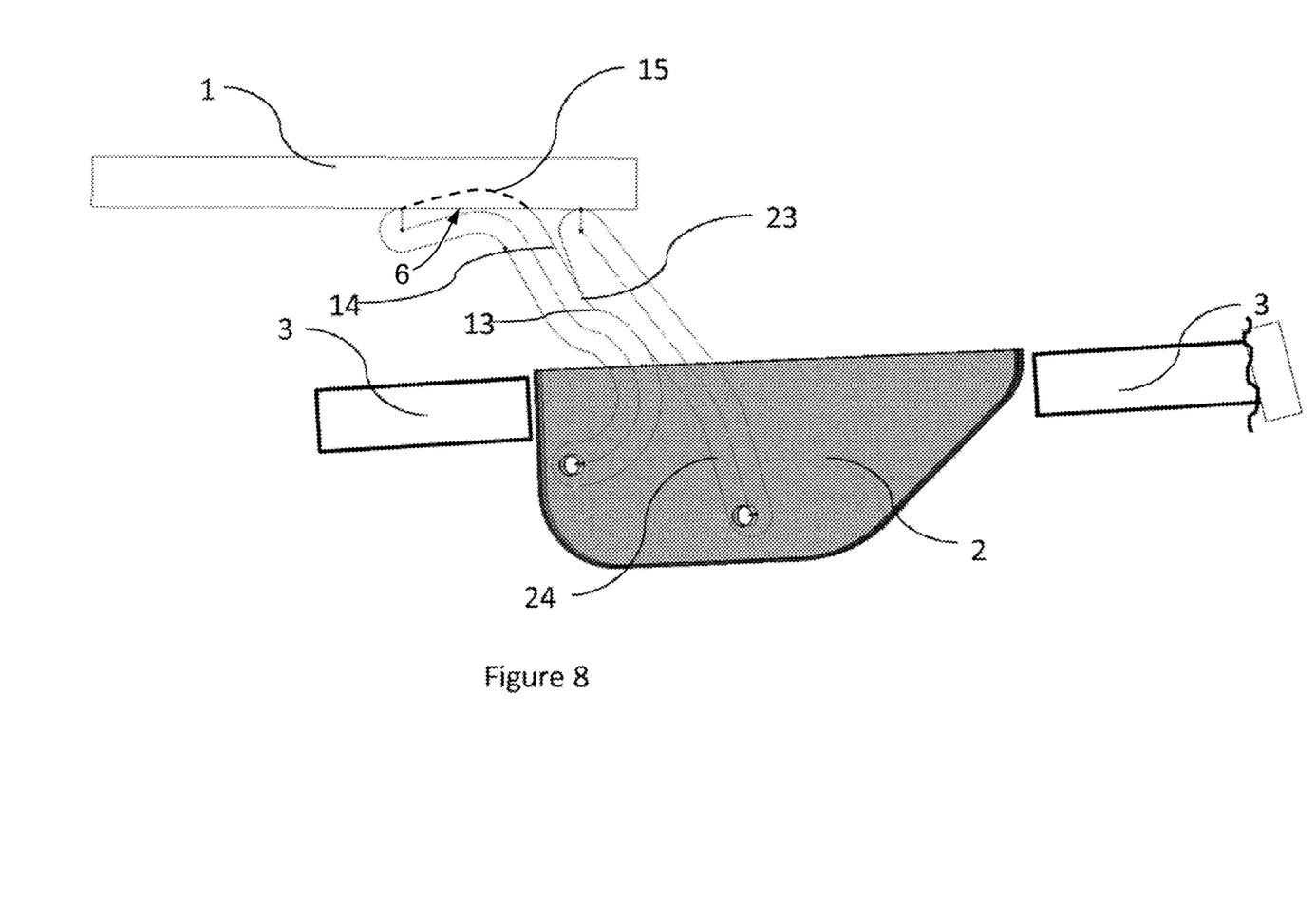

In the fully-deployed position illustrated in FIG. 8, the first engaging member 23 is engaged with the first support surface 13 and the seat-supporting member 15 is engaged with the underside of the seating surface 1. It can be seen that the second support surface 24 and second engaging member 14 are now substantially separated from one another.

Figure 9:
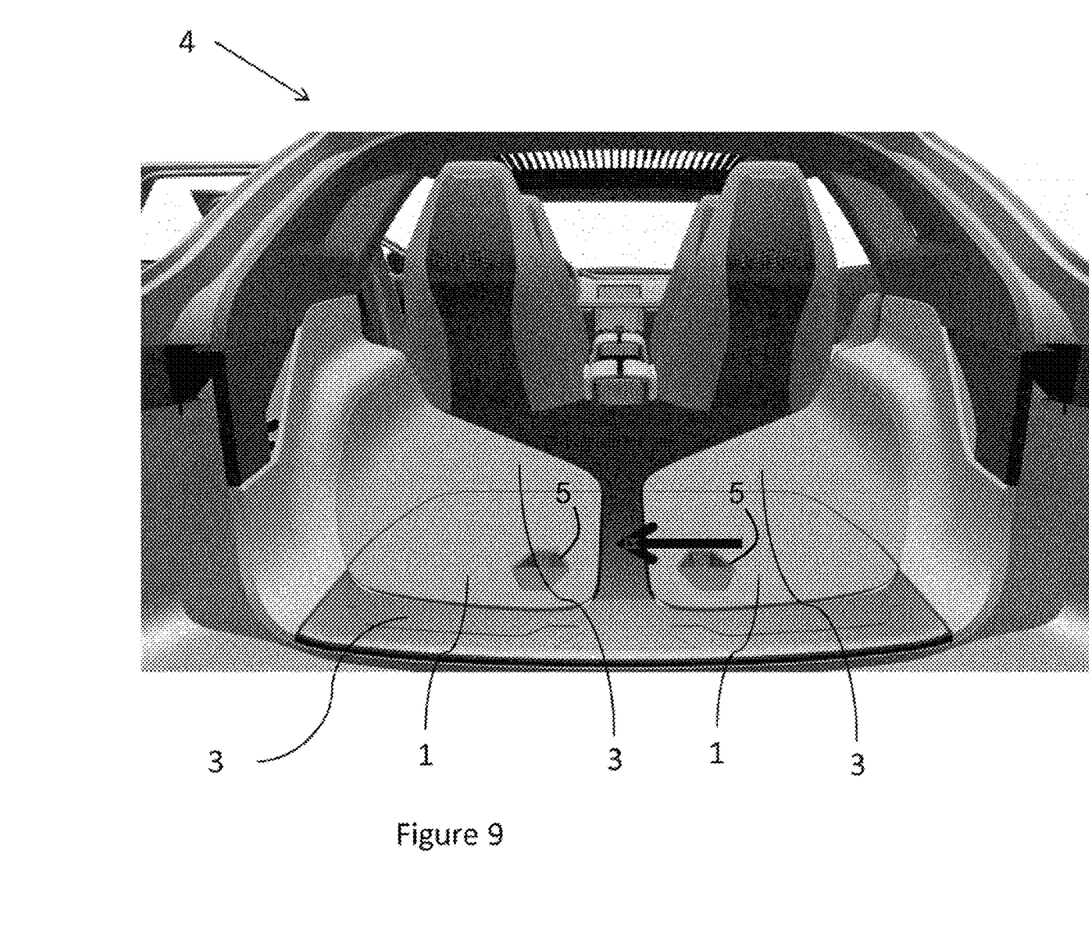
FIG. 9 is a schematic view of a vehicle including vehicle seating according to an embodiment of the invention, with an arrow indicating the direction of viewing for FIGS. 2 and 3.

FIG. 9 is a schematic view of a vehicle including vehicle seating according to an embodiment of the invention.

The vehicle seating system described herein has substantial advantages over the prior art seating arrangements. In particular, the deployed seating surface 1 may be located directly above or above and extending beyond the rear bumper or rear edge of the load space of the vehicle, providing a desirably high seating position wherein legroom is not affected by the bumper or load space edge and where the seat is readily accessible for use.

The vehicle seating system described herein is particularly applicable to vehicles having a single upwardly-opening or side-opening tailgate.

The invention claimed is:

1. Vehicle seating, selectively deployable at the rear of a vehicle for providing temporary outdoor seating, comprising:
   a seating surface having a front edge nearest the rear of the vehicle, a rear edge nearest the front of the vehicle, in use;
   a supporting structure locatable within or beneath a load floor of a vehicle;
   a first support leg pivotally connected at a first end to the underside of said seating surface and pivotally connectable at a second end to said supporting structure and having a rear-facing first support surface between the ends;
   a second support leg pivotally connected at a first end to the underside of said seating surface and at a second end to said supporting structure and having a forward-facing first engaging member between the ends,
   wherein the seating is moveable between a first, stowed position in which the seating surface is locatable on or within the load floor of the vehicle and a second, deployed position in which the support legs and seating surface connected thereto are pivoted up and out of the load floor so that said seating surface overlaps with or extends beyond a rearmost edge of the vehicle and said engaging member engages said support surface to provide load bearing support for said seating surface.

2. Vehicle seating as claimed in claim 1 wherein, in said stowed position, the seating surface is substantially flush with the surface of the load floor.

3. Vehicle seating as claimed in claim 1 wherein said supporting structure is an enclosure mountable within or beneath the load floor of the vehicle and wherein, in said stowed position, the seating surface provides a lid for said enclosure which is substantially flush with the surface of the load floor and the first and second support legs are stowed at least partially within the enclosure.

4. Vehicle seating as claimed in claim 3 wherein the or each support surface is substantially the same width as the enclosure.

5. Vehicle seating as claimed in claim 1 wherein said seating surface has a length and the first and second support legs are axially aligned along said length of the seating surface, with the second support leg axially displaced from the first support leg towards said rear edge.

6. Vehicle seating as claimed in claim 1 wherein at least one of the first support leg or the second support leg is non-linear.

7. Vehicle seating as claimed in claim 6 wherein the first support leg and the second support leg are each non-linear.

8. Vehicle seating as claimed in claim 1 wherein said first support leg comprises a rear-facing second engaging member and wherein said second support leg comprises a forward-facing second support surface and, wherein, in said first stowed position, said second engaging member engages said second support surface to provide load bearing support for said seating surface.

9. Vehicle seating as claimed in claim 1 wherein the or each support surface comprises a shelf and the or each engaging member comprises a protrusion.

10. Vehicle seating as claimed in claim 1 wherein the first support leg comprises a seat-supporting member near its first end which, in the deployed position, engages the underside of the seating surface.

11. Vehicle seating as claimed in claim 10 wherein the underside of said seating surface includes a recess for receipt of said seat-supporting member.

12. Vehicle seating as claimed in claim 1 wherein said seating surface includes a handle thereon or therein.

13. Vehicle seating as claimed in claim 1 wherein the seating surface is made from or covered with the same material as the load floor of the vehicle in which the seating is to be installed.

14. A vehicle including vehicle seating as claimed in claim 1.

15. A vehicle as claimed in claim 14 wherein, in the deployed position, the seating surface is higher than a rear bumper of the vehicle.

16. A vehicle as claimed in claim 14 wherein, in the deployed position, the seating surface overlaps a rear bumper of the vehicle.

17. A vehicle as claimed in claim 14 wherein, in the deployed position, the seating surface extends beyond a rear bumper of the vehicle.

18. A vehicle including two separately operable vehicle seats as claimed in claim 1.

19. Vehicle seating, selectively deployable at the rear of a vehicle for providing temporary outdoor seating, comprising a seating surface having a front edge nearest the rear of the vehicle, in use, wherein the seating is pivotally connectable to a vehicle via at least one pivot member such that it is moveable between a first, stowed position in which the seating surface is locatable on or within the load floor of the vehicle and a second, deployed position in which the seating surface is pivoted up and out of the load floor so that said front edge of the seating surface overlaps with or extends beyond a rearmost edge of the vehicle.

\* \* \* \* \*